US009087081B2

(12) United States Patent
Cao et al.

(10) Patent No.: US 9,087,081 B2
(45) Date of Patent: Jul. 21, 2015

(54) METHOD AND SYSTEM OF SAVING AND QUERYING CONTEXT DATA FOR ONLINE APPLICATIONS

(75) Inventors: Shu Xia Cao, Beijing (CN); Si Bin Fan, Beijing (CN); De Shuo Kong, Beijing (CN); Shou Qing Liang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/889,895

(22) Filed: Sep. 24, 2010

(65) Prior Publication Data

US 2011/0106841 A1 May 5, 2011

(30) Foreign Application Priority Data

Oct. 30, 2009 (CN) .......................... 2009 1 0211380

(51) Int. Cl.
G06F 7/00 (2006.01)
G06F 17/30 (2006.01)
(52) U.S. Cl.
CPC .... G06F 17/30286 (2013.01); G06F 17/30873 (2013.01)
(58) Field of Classification Search
CPC ................................................ G06F 17/30873
USPC ......................................................... 707/769
See application file for complete search history.

(56) References Cited

U.S. PATENT DOCUMENTS

| 7,392,510 B1 | 6/2008 | Treader |
| 7,480,900 B1 | 1/2009 | Zhou |
| 7,512,933 B1 | 3/2009 | Tortosa |
| 2005/0229167 A1* | 10/2005 | Henning et al. ............. 717/143 |
| 2006/0149728 A1* | 7/2006 | Error et al. ........................ 707/5 |
| 2006/0224938 A1* | 10/2006 | Fikes et al. .................... 715/500 |
| 2007/0078701 A1 | 4/2007 | Bliznak |
| 2008/0120602 A1 | 5/2008 | Comstock |
| 2008/0140697 A1* | 6/2008 | Papadimitriou et al. ...... 707/102 |
| 2008/0184206 A1 | 7/2008 | Vikutan |
| 2009/0049428 A1 | 2/2009 | Cozmei |
| 2009/0070633 A1 | 3/2009 | Staneff |
| 2009/0106597 A1 | 4/2009 | Branca |
| 2009/0182643 A1* | 7/2009 | Holstein et al. ................ 705/26 |

FOREIGN PATENT DOCUMENTS

| CN | 1791022 A | 6/2006 |
| CN | 101446979 A | 6/2009 |
| EP | 1 050 817 | 8/2000 |

* cited by examiner

*Primary Examiner* — Fred I Ehichioya
*Assistant Examiner* — Kris Mackes
(74) *Attorney, Agent, or Firm* — George R. McGuire; Bond Schoeneck & King, PLLC; John Pivnichny

(57) ABSTRACT

The present invention provides methods and systems for saving and querying context data for an online application. The context data of an online application related to pages visited by a user are collected, where the context data is associated with page identifiers of the visited pages. A step-by-step path is generated based on the page identifiers of the pages visited by the user, and a context data record is generated and saved based on the collected context data and the step-by-step path. According to the methods and systems, a query term is further generated using on the collected context data and the step-by-step path, for performing query to the context data. By applying the methods and systems of the present invention to different contexts, the user is able to easily save and later reference the previous actual running data of some functional contexts.

6 Claims, 6 Drawing Sheets

Page flow browsed by the user

Page 1 → Page 2 → Page 3

Edit page data-Currently selects Page 1

Input data:username  keithf    password  M1 stesst1

Page content:TimeZone  GMT+8   Department  Software Development

For other input data, spaced with ;

Version 10    Build 101

○ Complete matching path   ○ Current page as the starting point   ○ Current page as the end point   ○ Include the current page Query    Close the window

Fig.7

METHOD AND SYSTEM OF SAVING AND QUERYING CONTEXT DATA FOR ONLINE APPLICATIONS

CROSS-REFERENCE TO RELATED APPLICATIONS

The present application claims priority to People's Republic of China Application No. 200910211380.2, filed on Oct. 30, 2009, the content of which is relied upon and incorporated herein by reference in its entirety.

BACKGROUND OF THE INVENTION

The present invention relates to the processing of an online application, and, more specifically, relates to a method and system for saving and querying context data for an online application.

The lifecycle of software typically involves a plurality of complex processes such as development, testing, and use, as well as management and maintenance. During these different processes, different users will perform a series of operations to the software. In certain circumstances these users must reference actual running data. For example, during development and testing processes, a testing engineer cross-tests a function, command, or process which has been tested by a previous testing engineer but finds a problem in the system. Accordingly, the testing engineer will need to know the previous testing results. Alternatively, a developer might need to obtain a precise problem representation process or compare multiple testing results to find at which stage the problem occurs, or, when the system is installed on a different testing environment or has different builds, the developer and testing engineer need to compare the effects of these factors on the testing results.

Further, after the system is formally online and an end user begins to use the software, he/she always needs a considerable amount of training time and training materials to get familiar with relevant functions of the software so as to be capable of operating the software correctly; if the user may refer to sample data of relevant circumstances at any time during using the software, a more effective self-help system is achieved. As far as software management and maintenance engineers are concerned, they may want to save the system configurations and the results after configuration such that they can compare the data to identify the most effective system configuration or record old system configuration records.

Additionally, if a system has a plurality of versions, an analyst or a newly added project group member sometimes needs to quickly study functions of old versions, and customer service staff often needs to query functions of different versions of systems as required by customers.

Some prior art implementation methods include, from the perspective of testing engineers, analyzing corresponding testing instances based on the functions currently required to study and then retrieving corresponding testing data in a relevant storage space. From the perspective of developers, prior art methods include analyzing code sections corresponding to current functions and then retrieving corresponding running data records based on corresponding codes. However, the above methods are quite troublesome and always likely infeasible. From the perspective of testing engineers, what are retrieved are mainly testing instances and testing logs, neither of which can guarantee integrity and diversity of the generated data during a testing process. And from the perspective of developers, they often are unable to retrieve corresponding running data records based on corresponding codes if the data generated by each step are not stored in the storage space.

BRIEF SUMMARY OF THE INVENTION

In light of the above disadvantages in the prior art, methods and systems for saving and querying context data for an online application according to the present invention are provided.

Other objects and advantages of the present invention will in part be obvious, and in part appear hereinafter.

In accordance with the foregoing objects and advantages, the present invention provides a method for saving context data (also called "scene data") for an online application. The method comprises the steps of: collecting context data relating to one or more pages accessed by a user in the online application, wherein the context data is a page identifier of each of the accessed pages; generating a path record comprising a page identifier of each of the accessed pages; generating a context data record comprising the collected context data and the generated path record; and storing the context data record in a non-transitory storage medium. In one embodiment, the context data can be anything associated with the accessed page, including but not limited to the version information, data input by the user, data generated by the system, a screenshot, image data, audio data, video data, or a combination of several things. In another embodiment, the path record comprises an initial page identifier of an initial page, an intermediary page identifier of each accessed intermediary pages, and an end page identifier of the end page.

According to a second aspect of the present invention is provided a method for saving context data for an online application wherein the step of collecting context data relating to one or more pages accessed by a user in the online application comprises the steps of: initiating the collection of context data in response to the user designating a page as the initial or start page; collecting context data relating to one or more intermediary page in response to the user accessing each intermediary page; and terminating the collection of context data in response to the user designating a page as the final or end page.

According to a third aspect of the present invention is provided a method for retrieving context data stored in a context data system. The method comprises the steps of: collecting context data relating to one or more pages accessed by a user in the online application, wherein the context data is a page identifier of each of the accessed pages; generating a path record using the page identifier of each of the accessed pages; generating a context data record comprising the collected context data and the generated path record; storing the context data record in the context data system; generating a context data query; and retrieving the context data record from the context data system using the query.

According to a fourth aspect of the present invention is provided the above method for retrieving context data stored in a context data system in which the step of collecting context data relating to one or more pages accessed by a user in the online application further comprises the steps of: initiating the collection of context data in response to the user designating a page as the initial or start page; collecting context data relating to one or more intermediary pages in response to the user accessing these pages; and terminating or ending the collection of context data in response to the user designating a page as the final or end page.

According to a fifth aspect of the present invention is provided the above method for retrieving context data stored in a context data system, further comprising the steps of: extracting a key word from the collected context data; and combining the extracted key word and the path record to generate the context data query. In one embodiment of the method, the context data record comprises a context data record migrated from another application.

According to a sixth aspect of the present invention is provided a system, such as a computer system, for recording context data for an online application. The system comprises: context data collecting means configured to collect context data relating to one or more pages accessed by a user in the online application, where the context data is a page identifier of each of the accessed pages; path record generating means configured to generate a path record using the page identifiers of each of the accessed pages; context data record generating means configured to generate a context data record using the collected context data and the generated path record; and context data record storing means configured to store the context data record in any non-transitory storage medium known in the art.

According to a seventh aspect of the present invention is provided the above-described system for recording context data for an online application, where the context data collecting means are further configured to: initiate the collection of context data in response to the user designating a page as the initial or start page; collect context data relating to one or more intermediary pages in response to the user accessing these pages; and ending or terminating the collection of context data in response to the user designating a page as the end or final page. In one embodiment, the context data can be anything associated with the accessed page, including but not limited to the version information, data input by the user, data generated by the system, a screenshot, image data, audio data, video data, or a combination of several things. In another embodiment, the path record comprises an initial page identifier of an initial page, an intermediary page identifier of each accessed intermediary pages, and an end page identifier of the end page. Additionally, the context data records can be context data records migrated from another application.

According to an eighth aspect of the present invention is provided the above system for recording context data for an online application, further comprising: context data query generating means configured to generate a context data query; and context data record retrieving means configured to retrieve context data record from the storage medium. In one embodiment, the context data query generating means are further configured to: extract a key word from the collected context data; and combine the extracted key word and the path record to generate the context data query.

According to a ninth aspect of the present invention is provided a computer program stored on a computer useable storage medium, the computer program configured to implement a method for recording context data for an online application, the method comprising the steps of: collecting context data relating to one or more pages accessed by a user in the online application, wherein the context data is a page identifier of each of the accessed pages; generating a path record using the page identifier of each of the accessed pages; generating a context data record comprising the collected context data and the generated path record; and storing the context data record in a non-transitory storage medium. In one embodiment, the method further comprises the steps of generating a context data query; and retrieving the context data record from said storage medium using said query.

According to a tenth aspect of the present invention is provided the above computer program, where the step of collecting context data relating to the one or more pages accessed by the user in the online application further comprises the steps of: initiating the collection of context data in response to the user designating a page as the start or initial page; collecting context data relating to one or more intermediary pages in response to the user accessing intermediary pages; and terminating, ceasing, or ending the collection of context data in response to the user designating a page as the final, end, or terminating page.

According to an embodiment of the present invention, there is provided a method for saving context data for an online application, comprising: collecting context data of the online application related to pages visited by a user, wherein the context data is associated with page identifiers of the pages visited by the user; generating a step-by-step path based on the page identifiers of the pages visited by the user; generating a context data record based on the collected context data and the step-by-step path; and saving the context data record.

According to another embodiment, there is further provided a method for querying context data for an online application, wherein context data records are stored in a context data system, the method comprising: collecting context data of the online application related to pages visited by a user, wherein the context data is associated with page identifiers of the pages visited by the user; generating a step-by-step path based on the page identifiers of the pages visited by the user; generating a context data query term based on the collected context data and the step-by-step path; and querying the context data record in the context data system by the context data query term.

According to a further embodiment of the present invention, there is further provided a system for saving context data for an online application, comprising: context data collecting means configured to collect context data of the online application related to pages visited by a user, wherein the context data is associated with page identifiers of the pages visited by the user; step-by-step path generating means configured to generate a step-by-step path based on the page identifiers of the pages visited by the user; context data record generating means configured to generate a context data record based on the collected context data and the step-by-step path; and context data saving means configured to save the context data record.

According to a still further aspect of the present invention, there is further provided a system for querying context data for an online application, wherein context data records including context data are stored in context data storage means, the system comprising: context data collecting means configured to collect context data of the online application related to pages visited by a user, wherein the context data is associated with page identifiers of the pages visited by the user; step-by-step path generating means configured to generate a step-by-step path based on the page identifiers of the pages visited by the user; context data query term generating means configured to generate a context data query term based on the collected context data and the step-by-step path; and context data query means configured to query the context data record in the context data storage means by the context data query term.

By applying the methods and systems of the present invention to different contexts, a user is enabled to easily achieve saving and later referencing the previous actual running data of some functional contexts. For example, while a testing engineer is running a testing instance, data input, page content, and screen snap can be automatically recorded, without manual work; even during an automatic testing process, only a basic call configuration is required in the process of developing an automatic script, without writing a considerable amount of codes to record data records. Moreover, an end user or a project member may search and find relevant context data records while running a current online running system, without the necessity of searching other resources. Compared with methods of associating through codes or testing instances, the methods and systems according to the present invention have advantages of promptness, efficiency, and high accuracy.

BRIEF DESCRIPTION OF THE SEVERAL VIEWS OF THE DRAWING(S)

The above and other objectives, features, and advantages of the present invention will become more apparent through more detailed description of the preferred embodiments of the present invention as illustrated in the drawings.

FIG. 7 shows a context data query window according to one embodiment of the present invention.

DETAILED DESCRIPTION

Hereinafter, the present invention will be described with reference to the methods and apparatuses according to embodiments of the present invention, wherein each block in the flow charts and/or block diagrams and combinations of blocks in the flow charts and/or block diagrams of the accompanying figures may be implemented by computer program instructions. These computer program instructions may be provided to the processor of a general purpose computer, a special purpose computer, or other programmable data processing apparatus, thereby producing a machine such that these instructions as executed through the computer or other programmable data processing apparatus create means for implementing the functions and/or operations described herein.

The computer program instructions may also be stored in a non-transitory computer-readable medium capable of instructing a computer or other programmable data processing apparatus to work in a particular manner, such that the instructions stored in the computer-readable medium produce an article of manufacture including instruction means for implementing the functions/operations prescribed in the blocks of the flow charts and/or block diagrams.

The computer program instructions may also be loaded onto a computer or other programmable data processing apparatus, such that a series of operation steps are performed on the computer or other programmable data processing apparatus to produce a computer-implemented process. This execution of the instructions on the computer or other programmable apparatus provides a process of implementing the functions/operations prescribed in the blocks of the flow charts and/or block diagrams.

Figure 1:
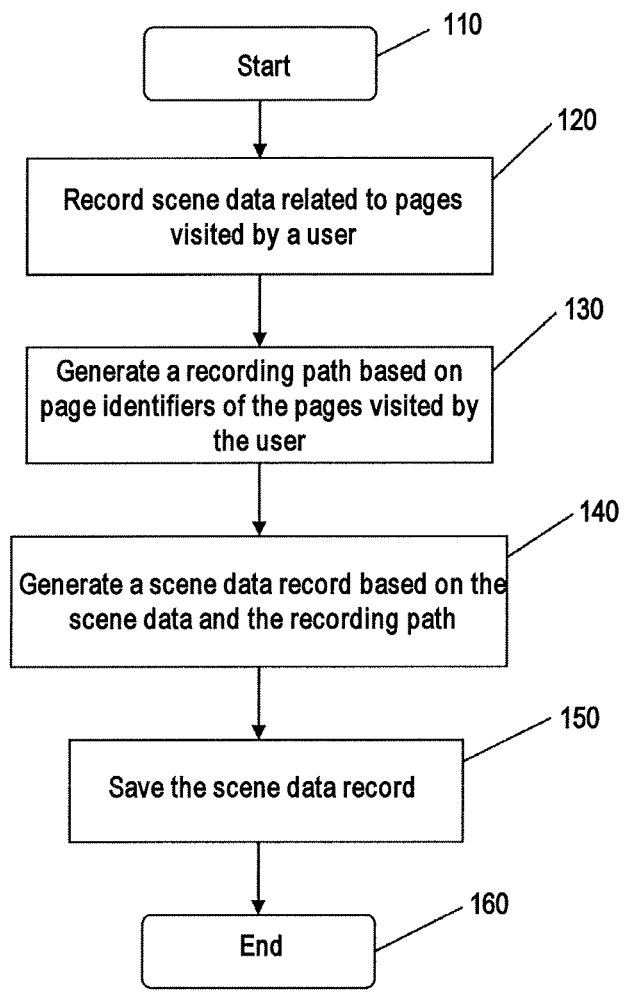
FIG. 1 is a flow chart of a method for saving context data for an online application according to one embodiment of the present invention.

Hereinafter, a method for generating a context data (also called "scene data") record for an online application according to one embodiment of the present invention will be described with reference to FIG. 1. Firstly, the method begins at step 110. At step 120, context data of the system related to pages visited by a user is recorded, wherein the context data is associated with page identifiers which are unique to the visited pages. As described in the following embodiment, the user may designate an initial page and an end page to be recorded through a user interface, and all context data related to each page visited by the user between the initial page and the end page can be recorded.

At step 130 a step-by-step path is generated based on the page identifiers from the pages visited by the user. Since the starting point of the step-by-step path may be an initial page designated by the user and the end point may be a final page designated by the user, the step-by-step path will include one or more identifiers of an initial page of the path, one or more identifiers of middle pages of the path, and one or more identifiers of an end page of the path.

At step 140, a context data record is generated based on the recorded context data and the step-by-step path. At step 150, the context data is saved in a database for future query, and the method ends at step 160.

The context data system can determine whether a plurality of pages are different instances of a same page based on page identifiers of a Web application, while components of the page identifier are not fixed, but are configurable.

If the same operation is performed on a current page and the resulting pages are all uniquely determined, then generally, the uniform resource identifier ("URI") can be used as the page identifier. For example, the page identifier may be set as: /wps/login. In this embodiment, no matter how different the user names and passwords as input by users in the login page are, as long as they are correct and valid the page structures visible to these users are all identical. Of course, it is necessary that the users belong to a same access group, that data classifications visible are identical, and that specific values visible to each person are also identical.

If the operation is performed on the current page and the resulting pages are not unique but display different page structures based on different values of some transmission parameters, then the page identifiers can be composed of the URI plus transmission parameter names, according to one embodiment of the present invention. For example, for /wps/login the data input in one login page is: action=userlogin&username=caoshuxia&password=****  while the data input in another login page is: action=adminlogin&username=fansibin&password=****. Since the two users belong to different access groups in the Web application, and this Web application defines the data classifications visible to different access groups differently, it would not suffice to determine the resulting pages using only the URI. However, using action as a transmission parameter will allow the Web application to distinguish these two users, thereby obtaining resulting pages with different page structures.

An administrator of the context data system may set the page identifier as: /wps/login(action). In this case, the parameter name of a transmission parameter is generally added to the tail of the URI to thereby form the page identifier together, while the parameter name and parameter value of the transmission parameter both may be obtained through a GET or POST service provided by HTTP.

In a more special case, where a same context data management system is used to manage different clients (for example, different companies or different departments), business data between different clients are mutually transparent, and in this case, it is necessary to configure a more flexible parameter. This case generally occurs when page structures of resulting data are identical, while the data displayed on the page needs to be filtered based on different organizational structures. For example, for /wps/login, the URI for one login page is: /wps/portal/departmentA/login, while the URI for another login page is: /wps/portal/departmentB/login.

The administrator of the context data system may set this page identifier as /wps/portal/*/login such that all similar pages, which are only different in a certain configurable parameter field, may use the same page identifier.

When a URI automatically jumps to another URI to generate a new page, the context data system will record the URI of the most recent generated page.

Generally, the URI key elements of a page and the designated page data will not change; and if they change in special circumstances, the administrator may make an inter-version correspondence between newly calculated page identifiers and the old page identifiers. Thus, after system migration is performed, data records of different versions may be queried based on this inter-version correspondence during the process of data record query. For example:

| Version | Page | Page Identifier |
|---------|-------|--------------------|
| V1.0 | Page1 | /wps/login(action) |
| V2.0 | Page1 | /wps/portal/*/login |
| V3.0 | Page1 | NULL |

Figure 2:
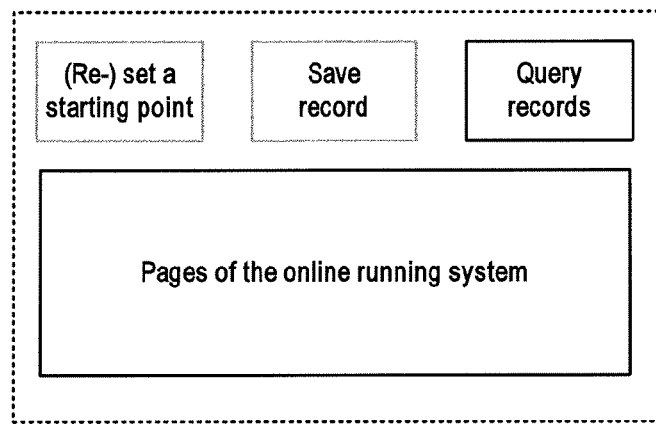
FIG. 2 shows a user interface for context data generation.

Hereinafter, a method for generating a context data record for an online program according to one embodiment of the present invention will be further described with reference to FIGS. 2 and 3. FIG. 2 shows a user interface for context data generation. The user graphic interface as shown in FIG. 2 is divided into two parts, the first part being a page of the online running system, and three buttons in the second part being control buttons provided by the context data system to a common user. There can be additional buttons for administrators in order to provide richer functions. For collecting context data, it is only necessary to use the buttons "(re-) set a starting point" and "save records."

Figure 3:
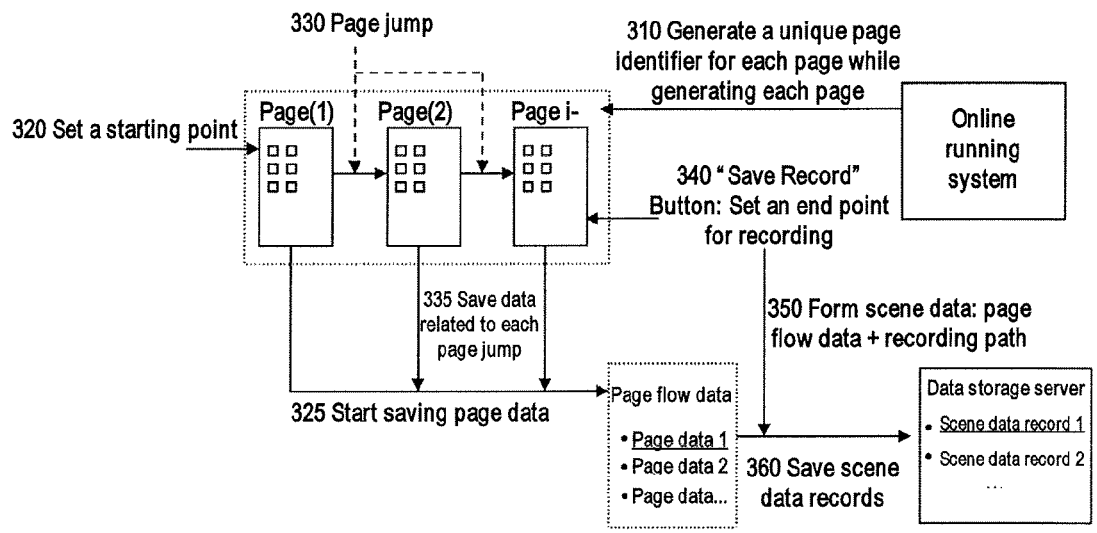
FIG. 3 is a diagram of context data generation according to one embodiment of the present invention.

Next is described the process by which the context data system implements the collection, formation, and saving of data, with reference to the diagram of context data generation as shown in FIG. 3.

When a user logs into an online system, the context data system begins to record corresponding information of this login, including the software system's general version number and sub-version number, among other types of information. At step 310, when the user enters into a random page, i.e., filing a request for page entry by clicking a navigation map or by other means, the application server will respond to the request. The response process can include generating a page and/or generating a unique page identifier for the page. When the response returns to the client side, the requested page will be presented to the user.

At step 320, when the user enters into a page, the page will display a user interface as shown in FIG. 2. The user clicks on the button "set a starting point" and the context data system receives the user request: the user will start collecting context data with this page as the initial page, i.e., as the starting point for the step-by-step path. Accordingly, as shown at step 325, the system will save all data related to the current page, wherein the context data may include input data (user data) and output data (data created by the system and loaded to the browser): for input data, user modified page data may be considered as the input data for the next page, or it may be obtained by retrieving the Post/Get parameter in the HTTP request as the input data for the current page; and for output data (i.e., page content), the context data system will begin saving all data related to the current page. Generally, for structure-type data (such as integer, decimal, character string, etc.), the context data system will save all page data (such as in HTML form) and will screen snap, image, or record the page display; for non-structural data (i.e., such as stream data, including image, audio, video, etc.), the context data system will assign each stream data a separate space for saving.

At step 330, when the user leaves the current page and enters into the next page, a page jump is realized. Since the page identifier changes at this time, the software system will automatically send the following new request to the context data system: continuing saving relevant data of the current page which is jumped to. In response to the new request, the context data system will continue saving all data related to the current page which is jumped to. With the page jump, as shown in step 335 the context data system will collect and save each current page which has been jumped to as page data 2, page data 3, page data n, and so on, with this series of response processes being completely invisible to the user.

At step 340, after the user enters into a page and clicks the button "save records," the context data system receives the following user request: the user will take this page as the end page, i.e., the end point of the step-by-step path. As a response, the context data system will save all data related to the current page and form a step-by-step path (including the identifier of the initial page of the path, the identifier(s) of the midway page(s) of the path, and the identifier of the end page of the path); and moreover, even if further pages are navigated the context data system will not record relevant data.

Next, at step 350, the context data system reorganizes the collected data. The initial page data, midway pages data, and end page data are integrated into logical page flow data which corresponds to a step-by-step path to form a context data record. The context data record is stored in a data storage server, as shown in step 360.

After the data storage server successfully saves the context data record, the context data system will clear out the collected and formed context data to prepare for the next context data collection. By clicking on the button "(re-) set a starting point", the context data system will start a new round of data collection work.

Before generating the context data, the administrator should complete installation of the context data system on the online system and configure it properly so as to guarantee normal start and operation of the context data system. The administrator may further migrate the corresponding context data from the context data system in the testing environment to the context data system in the online system, and data migration may guarantee that although the context data system in the online system has not been used to generate data yet, the end user can still start querying context data.

For an end user, only by using two buttons provided by the context data system to determine the initial page and the end page can all data of all pages on the corresponding step-by-step path be collected integrally. Further, only these two actions enable the end user to feel that he/she has sent a task request to the context data system. For other actions operated by the end user, such as data operation, triggering the button on the online system page, or page jump of the online system, for example, a request for recording page data will be sent to the context data system, except that such requests are not seen by the user. Accordingly, only the operations of starting recording context data and stopping recording context data as executed by the context data system are knowable to the end user.

Hereinafter, formation of page flow data will be described through the following specific instance:

```
/** version information of the currently online running system */
<Release>2.2</Release>
<Build>2.2.5</Build>
    /**serial number automatically generated by the system, either the
session ID of the application system or the serial number can be taken */
    <LogID>Session10001212</LogID>
    /** page flow of a functional context*/
    <Path>Page 1 identifier/Page 2 identifier/Page 4 identifier</Path>
    /** refer to the basic data part for page data*/
    <Page =Page1 identifier>
    <URI>URI info</URI>
    <Input>Test Data inputted</input>
    <content>all HTML content of the page</content>
    /** screen snap of the current page, if saved in the database, it can be
directly saved; if saved in a directory, a directory may be set to save the
document, the document name being defined based on version and page
flow sequence, this field being for saving this document name */
    <Screenshot>image.gif<Screenshot>
    </Page>
    <Page =Page 2 identifier>
    <URI>URI info</URI>
    <Input>Test Data inputted</input>
    <content>all HTML content of the page</content>
    <Screenshot>image.gif</Screenshot>
    </Page>
    <Page =Page 4 identifier>
    <URI>URI info</URI>
    <Input>Test Data inputted</input>
    <content>all HTML content of the page</content>
    <Screenshot>image.gif</Screenshot>
    </Page>
```

Besides default content, the administrator can also customize other fields to generate new content as well as obtain manners of their values such as debugging log associated with a page or a page flow, or other note information, for example. The administrator may also configure the physical location for storing data records, including in a database or in a certain directory structure. The user, with appropriate privilege, may modify these records. Such modification includes deleting some redundant records and adjusting some data in use.

Figure 4:
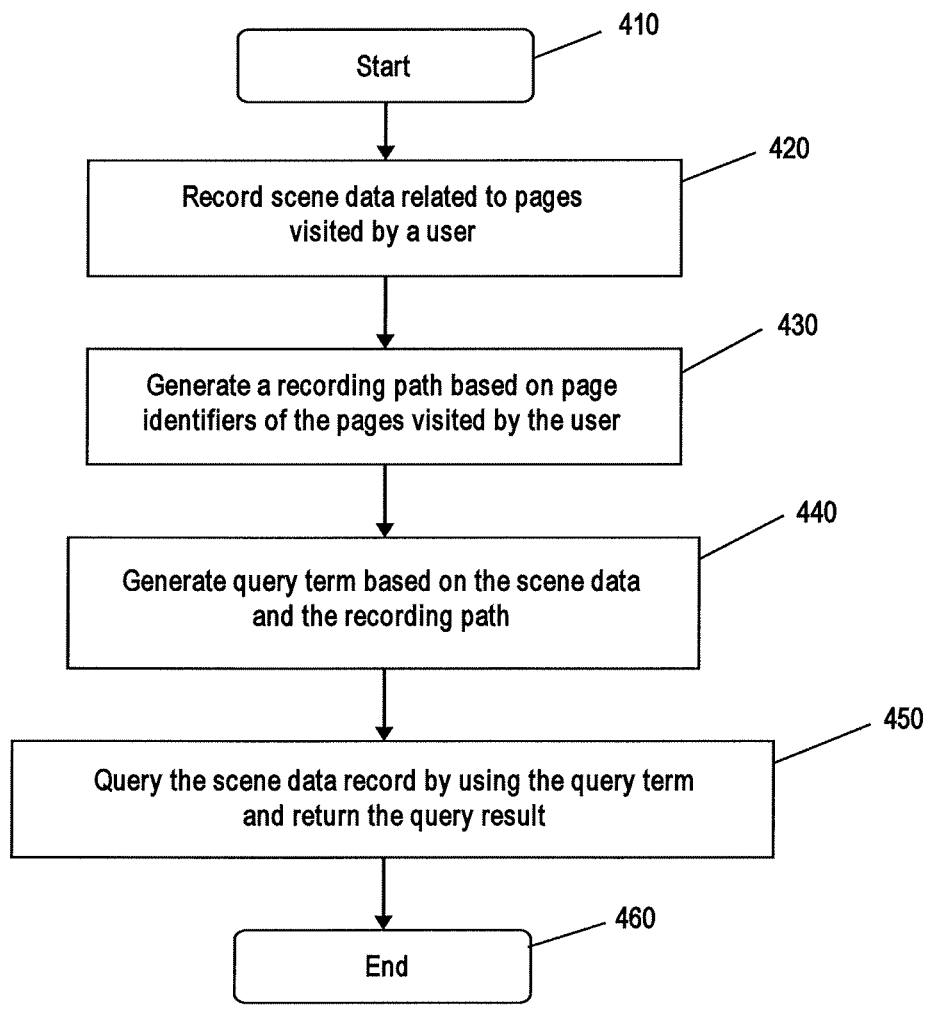
FIG. 4 is a flow chart of a method for querying context data for an online application according to one embodiment of the present invention.

Hereinafter, a method for querying a context data record according to one embodiment of the present invention will be described with reference to FIG. 4. The method begins at step 410. At step 420, context data of the online running system related to pages visited by a user is recorded, wherein the context data is associated with page identifiers of the pages visited by the user, the page identifiers being unique to the pages. As described in the following embodiment, the user may designate an initial page and an end page to be recorded through a user interface, and for all pages visited by the user between the initial page and the end page all context data related to these pages can be recorded.

At step 430, a step-by-step path is generated by the context data system based on the page identifiers of the pages visited by the user. The starting point of the step-by-step path may be an initial page designated by the user, while its end point may be an end page designated by the user. Accordingly, the step-by-step path includes an identifier of an initial page of the path, identifier(s) of midway page(s) of the path, and an identifier of an end page of the path.

At step 440, a query term for querying context data is generated based on the recorded context data and the step-by-step path. At step 450, a query is performed against the context data records stored in the data storage server using the query term, and the query result is returned. The method ends at step 460.

Figure 5:
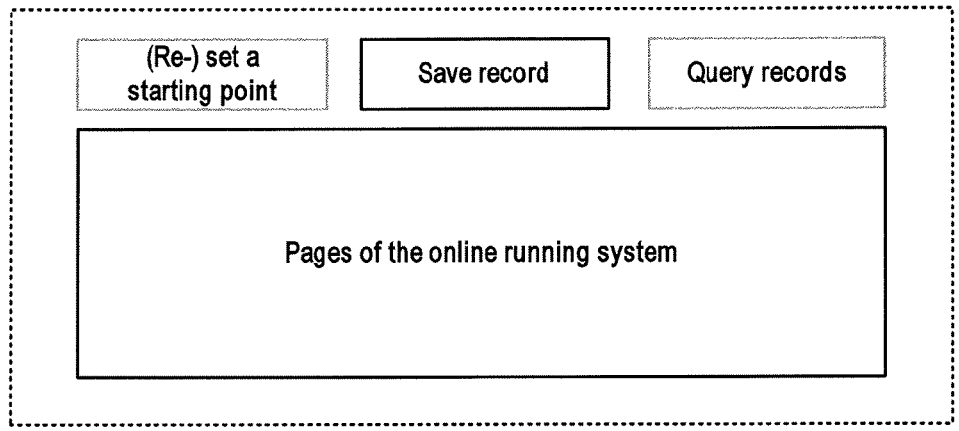
FIG. 5 shows a user interface for context data query.

Hereinafter, a method for implementing a context data query according to one embodiment of the present invention will be described with reference to FIGS. 5 and 6. FIG. 5 shows a user interface for a context data query. This interface is identical to the user interface of context data generation, except that it uses the following two buttons: the "(re-) set a starting point" button and the "query records" button.

Figure 6:
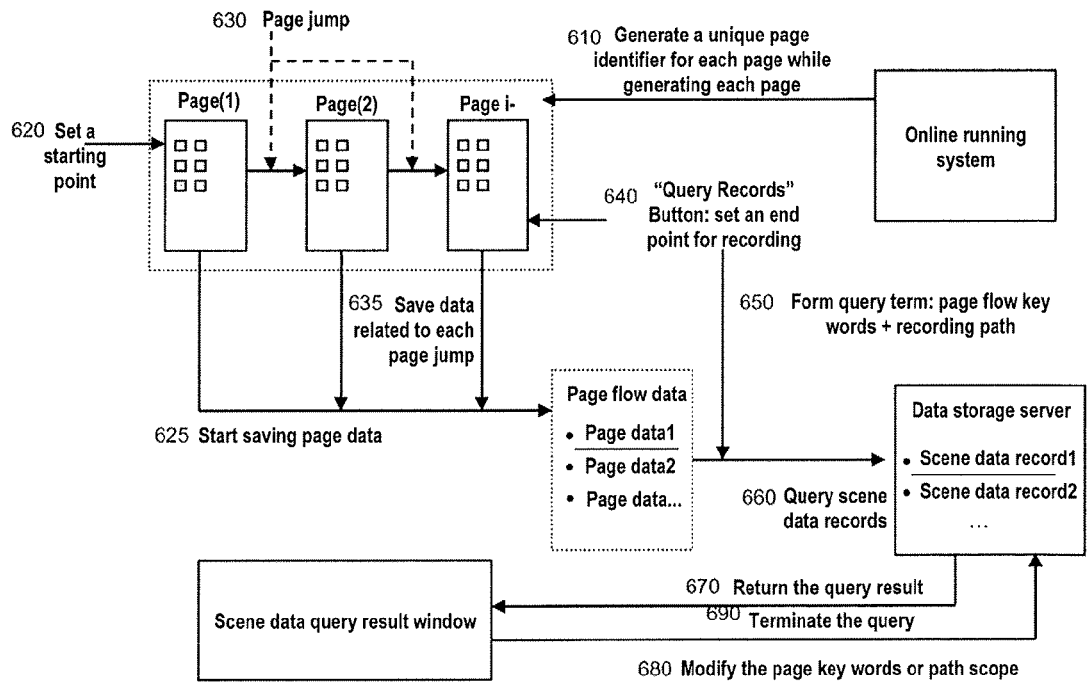
FIG. 6 is a diagram for context data query according to one embodiment of the present invention.

Below is described in detail—and with reference to a bottom layer implementation diagram of the context data query as shown in FIG. 6—the process by which the context data system implements a basic query of context data. Since a context data query also involves some steps also involved in context data collection, some steps are identical or similar to the steps of generating context data.

When a user logs into a software system with a context data system installed, the context data system begins recording relevant information about the login, including the software system's general version number, sub-version number, among many other types of information.

At step 610, when the user enters into a random page, such as by filing a request for page entry by clicking on a navigation map or by other means, the application server will respond to the request, the response process including generating a page and a unique page identifier for the page. When the response returns to the client side, the requested page will be presented to the user.

At step 620, after the user enters a page and clicks on the button "set a starting point," the context data system receives the user request and the user starts collecting context data with this page as the initial page (i.e., the starting point for the step-by-step path.) In response, at step 625 the context data system will start saving all data related to the current page.

At step 630, when the user leaves the current page and enters into the next page a page jump is realized. Since the page identifier changes at this time, the software system will automatically send the following new request to the context data system: continuing saving relevant data of the current page which is jumped to. In response, at step 635 the context data system will continue saving all data related to the current page which is jumped to. With each page jump, the context data system will collect and save each current page which has been jumped to as page data 2, page data 3, page data n, and so on, with this series of response processes being completely invisible to the user.

At step 640, after the user enters into a page and clicks on the button "query records," the context data system receives the following user request: the user will take this page as the end page (i.e., the end point of the step-by-step path.) In response, the context data system will save all data related to the current page, extract predefined key words of all pages from the initial page to the current page, and form a step-by-step path (including an identifier of an initial page of the path, identifier(s) of midway page(s) passed on the path, and an identifier of an end page of the path). Moreover, if further pages are navigated the context data system will not record relevant data.

Next, at step 650, the context data system reorganizes the collected data at the context data query window where an initial page key word, midway page(s) key word(s), and an end page key word will be mapped into key words of a logical page flow combined with a step-by-step path, thereby forming a query term.

At step 660, the context data system sends the query term to the data storage server as a context data query request. At step 670, if the data storage server successfully finds the context data record, it will display the query result on the context data query window which, from the perspective of user experience, seems to be generated by clicking on the button "query." Meanwhile, the context data system will clear out the context data which has been collected and formed in order to prepare for the next collection operation or query of context data. If the data storage server cannot find a corresponding context data record it will produce a dialogue window asking the user whether he/she intends to save the context data just collected. If the user consents, the context data system will file a request to save this context data record to the data storage server, and after the data storage server successfully saves the context data record the system will clear out the data which has been collected and formed in order to prepare for the next collection operation or query of context data.

At step 680, in a context data query result window context data query may be further performed by modifying the key words of browsed pages and path scope, among other methods of modification. At step 690, by clicking on the button "close the window" in the context data query result window the context data query result button will be closed and the flow returns to the user interface for context data generation as shown in FIG. 2 or the user interface for context data query as shown in FIG. 5. By clicking on the button "(re-) set a starting point," the context data system will start a new round of data collection or query work.

Hereinafter, the flexibility of several different methods for context data query will be more completely understood after explaining the methods in greater detail with reference to instances in the context data query result window as shown in FIG. 7. Assuming the user has performed the following operations in sequence: (i) the user successfully logged into an online system with a version of 1.0 and a build number of 1.0.1; (ii) coming to page 1, clicking on the button "(re-)set a starting point" provided by the context data system; inputting some data on page 1; with the user clicking on a button on the online system page 1, the online system jumping to page 2 in sequence; and (iii) likewise, inputting some data on page 2; with the user clicking on a button on the online system page 2, the online system jumping to page 3; on page 3, the user clicking on the button "query records" provided by the context data system; then the user will obtain a query condition page as shown in FIG. 7.

In the following example, the query term is adopted by a context data query as filed by a context data system to a data storage server according to one embodiment of the present invention. The query term is composed of two components, wherein one component is a step-by-step path and the other component is a key word(s) of a page flow.

The query condition page firstly lists a user current browse path comprising page identifiers of an initial page, midway page(s), and an end page. When a user selects a page, he/she can see the content of data operated in this page by the user, which is displayed in a form of key word(s). The input data is a Key/Value matching pair which is parsed to an area for inputting data. As to the page content, data with a Label/Value matching relationship is also parsed to the page content area. For data without such matching relationships, the user may be permitted to directly fill it in the query condition in a form of key word. The following may apply: (i) if page flow path and page content which have just been recorded are used in the query condition, they will be compulsorily subject to complete path matching query, and the returned query result is an exact match to the page flow and page key word; the query result will include this complete path; (ii) all pages in the page flow are maintained to be selected, such that the user may modify some data in the query condition or set some field values to be empty, and then such query result is fuzzy matching to the page key word; the query result will include this complete path; (iii) if the user only selects one page in the path, then the user may select to include the context data of this page, either taking the current page as the starting point or taking the current page as the end point; and (iv) by selecting different version numbers and build numbers, implementation instances of the same page in different versions may be queried.

Migrating data of the context data management system can better reuse the context data, while the precondition for data migration is very simple: (i) one context data management system as the source system and another context data management system as the destination system contain context data of a same software; and (ii) the data storage server for the source system can collaborate with the data storage server for the destination system.

One of most common cases is that the source context data management system and the destination context data management system belong to online applications of a same version of the software, while the destination context data management system is temporarily not deposited with any context data yet. In this case, data can be migrated directly as long as the administrator performs the corresponding configuration.

In another common scenario the context data in the source context data management system belongs to a lower version online system, while the context data in the destination context data management system belongs to a higher version online system. Since the context data management system has a page identifier matching table for a same page in different versions, the administrator must perform the corresponding configuration about version and page identifier such that after data migration is implemented, the context data of the same or similar page in different versions can also be queried.

According to another embodiment of the present invention, the context data in the source context data management system belongs to a higher version online system, while the context data in the destination context data management system belongs to a lower version online system. In this case, because a higher version software has not been deployed in the destination system yet, it is impossible to generate a higher version context data from the current lower version online system, and at this time the higher version context data is imported as a demo page to be demonstrated to the users so as to facilitate the user's understanding and promote potential business opportunities.

According to a further embodiment of the present invention, the context data in the source context data management system and the context data in the destination context data management system belong to online systems of a same version of the software. In this case, in order to guarantee data diversity the data are imported completely without discriminating the key word(s) of browsed pages and the administrator may discretionally delete the redundant context data according to the actual condition.

The greatest advantage of data migration is to compensate for context data generation merely by the online system in a production environment. With the guarantee of successful data migration, all users using the online system in the production environment may still query context data even under the condition that the local environment does not generate context data, while the context data generated in the testing environment can also enjoy a better and wider application.

In one embodiment according to the present invention, user privilege may also be set. Users' privileges are commonly determined by the online running system and the context data system. When a user accesses the online system through a context data system client, the online running system will check the authentication and the context data system will check the user's privilege and display a corresponding interface to the user.

Figure 8:
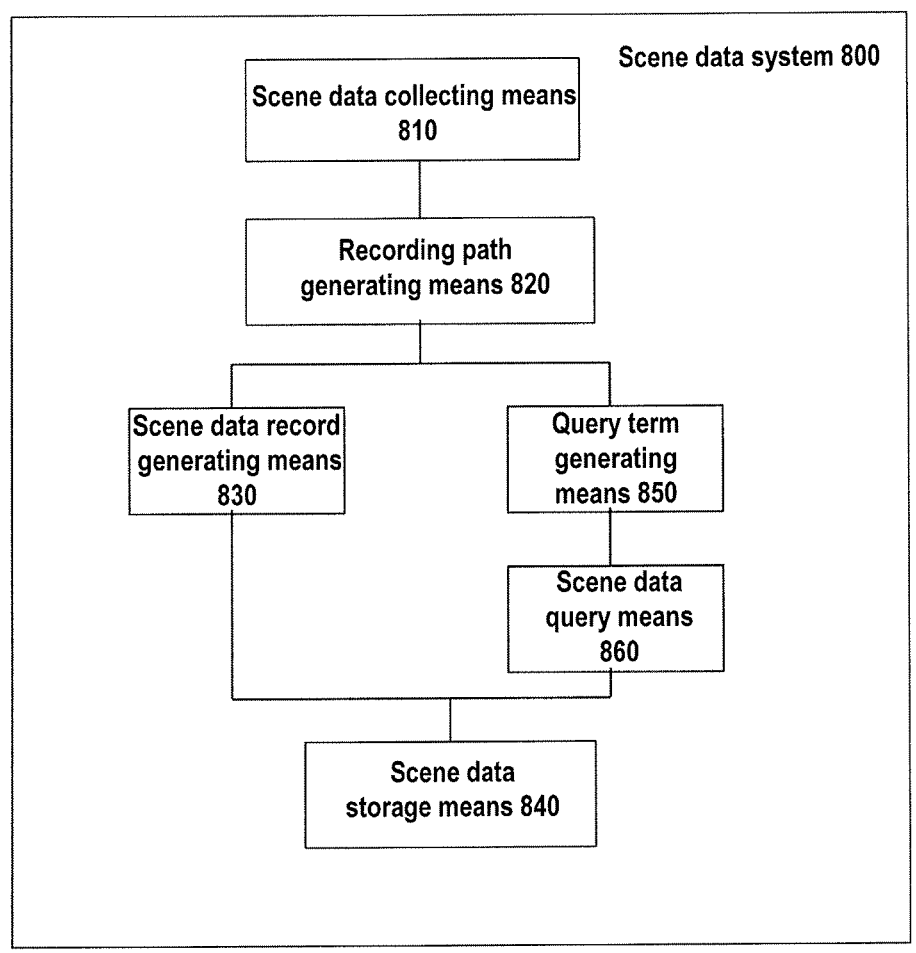
FIG. 8 is a block diagram of a system for implementing context data saving and query according to one embodiment of the present invention.

FIG. 8 shows a block diagram of a context data system for implementing context data saving and query according to one embodiment of the present invention. Specifically, the context data system 800 comprises the following: context data collecting means 810 configured to collect context data of an online running system related to the pages visited by a user, wherein the context data are associated with page identifiers of the pages visited by the user; step-by-step path generating means 820 configured to generate a step-by-step path based on the page identifiers of the pages visited by the user; and context data record generating means 830 configured to generate context data records based on the collected context data and the step-by-step path. The context data records generated by the context data record generating means 830 may be sent to the context data storage means 840 for saving and future query. Data in the context data storage means 840 may be generated by the user through the context data generating means or migrated from other environment. Further, the context data storage means can save not only current version context data of the online running system but also the context data information of preceding one or more versions. Thus, when the user uses the current version online running system, he/she may also query context data of the preceding one or more versions. It should be noted that although the context data storage means 840 is displayed within the context data system 800 in FIG. 8, the means 840 may also be disposed beyond the context data system 800 according to one embodiment of the present invention.

Moreover, the context data system 800 may further comprise query term generating means 850 configured to generate a context data record query term based on the recorded context data and the step-by-step path, as well as context data query means 860 configured to query the context data record in the context data storage means 840 based on the current query term. The context data collecting means is further configured to: (i) start collecting context data related to pages visited by the user in response to designating an initial page by the user; (ii) in response to occurrence of jump of a page visited by the user, collect context data related to a page which is jumped to, wherein the context data is associated with a page identifier of the page which is jumped to; and (iii) in response to designating an end page by the user, stop collecting context data related to the pages visited by the user. The query term generating means is further configured to: (i) extract a page key word from the recorded context data; and (ii) generate the context data record query term by combining the extracted page key word and the step-by-step path. Further, as previously described, a context data record in the context data storage means 840 may also be migrated from another same version or a different version context data system of the online running system. By adopting the above system, a method for saving context data and querying context data for an online application according to an embodiment of the present invention may be implemented.

Further, the context data system according to one embodiment of the present invention may be implemented either at a client side or at a server side, and further some means among various means included therein may be implemented at the client side, while the remaining means may also be implemented at the server side. Neither of the above implementation manners should be excluded from the protection scope of the present invention.

The following advantageous effects may be obtained by applying the methods and systems as described above to different scenarios: (i) while a testing engineer is running a test case, data input, page content, and screen snap can be automatically recorded without the exercise of manual work; even during an automatic testing process, only a basic call configuration is required when developing an automatic script, without writing a considerable amount of codes to store data records; (ii) an end user or a project group member may search and find relevant context data records while doing operation on a currently running online system, without the necessity of searching other resources; (iii) compared with performing association through codes or testing instances, this method has advantages of promptness, efficiency, and high accuracy; (iv) assuming the user does not know how to proceed with a subsequent operation, the operation manner of subsequent possible scenarios and possible input data and page content may be queried according to a part which has been currently executed; (v) Help Desk support is limited by human resources; if completely dependent on manual interaction, it is hard to provide a 24×7 service; if a telephone voice interaction is used, the end user needs more time to search the required information; however, our method can implement a 24×7 self-help service; (vi) a customer service employee or a project group member may look up context data records of other version when a latest version online running system is installed; (vii) system management and maintenance employee may easily and efficiently adjust the system configuration by recording the results generated by the system configuration data; and (viii) the methods further provide a manner of storing system changes by directly storing specific running records, which is different from the recording manner by using code changes or system function specification changes.

The present invention further provides a storage medium or signal carrier comprising instructions for executing the method of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code which comprises one or more executable instructions for implementing the specified logical function(s). It should also be noted that, in some alternative implementations, the functions noted in the block may occur out of the order noted in the figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Those skilled in the art should appreciate that the present invention may be embodied as system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (although a non-exhaustive list) of the computer-readable medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or any other suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention is described in detail with preferred solutions, it can be appreciated that the above embodiments are only for illustrative rather than limitation. The skilled person can modify the solutions of the present invention without departing from the spirit and scope of the present invention.

What is claimed is:

1. A method for recording context data for an online application, comprising:

displaying a context data user interface to a user accessing a page in the online application, the context data user interface comprising a first input element configured to receive a request from the user to designate a page as an initial page, further comprising a second input element configured to receive a request from the user to designate a page as an end page, and further comprising a query input element configured to receive a query from the user;

receiving, from the user through the first input element of the context data user interface, the request that said online application designate said page as the initial page;

designating, in response to said request for initial page designation, said page as the initial page of a plurality of pages accessed by the user;

initiating, in response to said initial page designation, the collection of context data for each of the plurality of pages accessed by said user, wherein the context data is a page identifier unique to each page;

collecting context data relating to the plurality of pages accessed by said user, wherein said plurality of pages comprises at least said initial page, an intermediary page accessed by said user, and last page accessed by said user, and further wherein the plurality of pages accessed by the user are not pre-selected by said user;

receiving, from the user through the context data user interface, an express request that said online application designate said last page as the end page, wherein said request comprises a selection by the user via the second input element of the context data user interface;

designating, in response to said express request for end page designation, said last page as the end page;

ending, only in response to said end page designation, the collection of context data;

generating, in response to ending the collection of context data, a step-by-step path record using the unique page identifier of each of said plurality of accessed pages;

generating a context data record comprising the collected context data and the generated path record;

storing the context data record in a non-transitory storage medium;

generating, before receiving a context data query from the user, a context data query term, wherein said context data query term is based on the generated context data record;

storing the generated context data query term in a non-transitory storage medium;

receiving from the user a context data query, wherein the context data query comprises a context data query term;

querying the stored context data record using the context data query; and displaying a result of the context data query to the user, if a result is returned by the context data query.

2. The method of claim 1, wherein the path record comprises an initial page identifier of said initial page, an intermediary page identifier of said intermediary page, and an end page identifier of said end page.

3. The method of claim 1, wherein the context data is selected from the group consisting of version information, data input by the user, data generated by the system, a screenshot, image data, audio data, video data, and a combination thereof.

4. The method of claim 1, wherein the step of generating a context data query further comprises:

extracting a key word from the collected context data; and
combining the extracted key word and the path record to generate the context data query.

5. The method of claim 1, wherein the context data record comprises a context data record migrated from another application.

6. A computer program stored on a non-transitory computer useable storage medium, the computer program configured to implement a method for recording context data for an online application, the method comprising the steps of:

displaying a context data user interface to a user accessing a page in the online application, the context data user interface comprising a first input element configured to receive a request from the user to designate a page as an initial page, further comprising a second input element configured to receive a request from the user to designate a page as an end page, and further comprising a query input element configured to receive a query from the user;

receiving, from the user through the first input element of the context data user interface, the request that said online application designate said page as the initial page;

designating, in response to said request for initial page designation, said page as the initial page of a plurality of pages accessed by the user;

initiating, in response to said initial page designation, the collection of context data for each of the plurality of pages accessed by said user, wherein the context data is a page identifier unique to each page;

collecting context data relating to the plurality of pages accessed by said user, wherein said plurality of pages comprises at least said initial page, an intermediary page accessed by said user, and last page accessed by said user, and further wherein the plurality of pages accessed by the user are not pre-selected by said user;

receiving, from the user through the context data user interface, an express request that said online application designate said last page as the end page, wherein said request comprises a selection by the user via the second input element of the context data user interface;

designating, in response to said express request for end page designation, said last page as the end page;

ending, only in response to said end page designation, the collection of context data;

generating, in response to ending the collection of context data, a step-by-step path record using the unique page identifier of each of said plurality of accessed pages;

generating a context data record comprising the collected context data and the generated path record;

storing the context data record in a non-transitory storage medium;

generating, before receiving a context data query from the user, a context data query term, wherein said context data query term is based on the generated context data record;

storing the generated context data query term in a non-transitory storage medium;

receiving from the user a context data query, wherein the context data query comprises a context data query term;

querying the stored context data record using the context data query; and displaying a result of the context data query to the user, if a result is returned by the context data query.

\* \* \* \* \*